(12) United States Patent
Yucek et al.

(10) Patent No.: US 8,149,685 B2
(45) Date of Patent: Apr. 3, 2012

(54) COVERT OFDM TRANSMISSION USING CYCLIC PREFIX

(75) Inventors: Tevfik Yucek, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 942 days.

(21) Appl. No.: 11/162,245

(22) Filed: Sep. 2, 2005

(65) Prior Publication Data
US 2006/0050626 A1 Mar. 9, 2006

Related U.S. Application Data

(60) Provisional application No. 60/522,235, filed on Sep. 3, 2004.

(51) Int. Cl.
*H04J 11/00* (2006.01)
(52) U.S. Cl. .......................... 370/208; 370/210
(58) Field of Classification Search .................. 370/208, 370/344, 480, 207, 210, 465, 503; 375/260, 375/296
See application file for complete search history.

(56) References Cited

U.S. PATENT DOCUMENTS

| | | | | |
|---|---|---|---|---|
| 6,038,321 A | * | 3/2000 | Torigai et al. | 380/268 |
| 6,438,367 B1 | * | 8/2002 | Crawford | 455/410 |
| 6,546,065 B1 | * | 4/2003 | Shimosakoda | 375/364 |
| 7,010,687 B2 | * | 3/2006 | Ichimura | 713/167 |
| 7,072,289 B1 | * | 7/2006 | Yang et al. | 370/208 |
| 7,203,158 B2 | * | 4/2007 | Oshima et al. | 370/208 |
| 2002/0054585 A1 | * | 5/2002 | Hanada et al. | 370/342 |
| 2004/0037215 A1 | * | 2/2004 | Hwang et al. | 370/203 |
| 2005/0100077 A1 | * | 5/2005 | Rosen et al. | 375/130 |
| 2005/0180315 A1 | * | 8/2005 | Chitrapu et al. | 370/208 |
| 2005/0259758 A1 | * | 11/2005 | Razzell | 375/260 |
| 2005/0265220 A1 | * | 12/2005 | Erlich et al. | 370/208 |

FOREIGN PATENT DOCUMENTS
WO  9730531  8/1997

OTHER PUBLICATIONS

A novel OFDM transmission scheme with length-adaptive Cyclic Prefix Zhang Zhao-yang et al. (Institute of Information and Communication Engineering, Zhejiang University, Hangzhou, China) revision accepted Nov. 5, 2003.*
S. Celebi, Interblock interference (FBI) and time reference (TOR) computation in OFDM systems, IEEE Trans. Commun., Nov. 2001, pp. 1895-1900, and vol. 49, No. 11.

(Continued)

*Primary Examiner* — Ricky Ngo
*Assistant Examiner* — David Oveissi
(74) *Attorney, Agent, or Firm* — Molly L. Sauter; Courtney M. Dunn; Smith & Hopen, P.A.

(57) ABSTRACT

Methods for secure OFDM communications include changing the length of OFDM symbols in a pseudo-random fashion by appending a totally random signal to some of the OFDM symbols. An adaptive cyclic prefix is provided for covert and spectrally efficient communication. A developed PN based random data addition provides further security by removing the chance of combining synchronization information over several OFDM symbols.

38 Claims, 5 Drawing Sheets

Illustration of the proposed transmission scheme. The resulting correlation peaks in the ideal case is shown as well.

OTHER PUBLICATIONS

W. Henkel et al., The cyclic prefix of OFDM/DMT . . . , Internatinonal Zurich Seminar on Broadband Commun., Feb. 2002, pp. 1-3,and Zurich Switzerland.

J. Van De Beek et al., ML estimation of time and frequency . . . , IEEE Trans Signal, Jul. 1997 pp. 1800 1805, and vol. 45 , No. 7.

M. Speth et al., Frame synchronization of OFDM . . . , Proc. IEEE Veh. Technol. Conf., May 1997, pp. 1807-1811, vol. 3, and Phoenix, AZ.

T.Keller et al., Orthogonal frequency division multiplex . . . , IEEE J. Select. Areas Cornmun., Jun. 2001, pp. 999 1008, and vol. 19, No. 6.

K. Witrisal et al., A new method to measure parameters . . . , IEEE Trans. Commun., Oct. 2001, pp. 1788 1800, and vol. 49.

H. Arslan et al., Delay spread estimation for wireless . . . , IEEE Symposium on Computers and Commun. Jun./Jul. 2003, and pp. 282 287.

* cited by examiner

Bit error rate degradation due to short cyclic prefix.

Fig. 3

Illustration of cyclic prefix based maximum likelihood estimation.

Fig. 4

The magnitude of the synchronization metric as a function of hypothesis cyclic prefix and data lengths.

Fig. 5

The correlations obtained by using the cyclic prefix and the resulting synchronization metric obtained by averaging.

Fig. 6

Illustration of the proposed transmission scheme. The resulting correlation peaks in the ideal case is shown as well.

COVERT OFDM TRANSMISSION USING CYCLIC PREFIX

CROSS-REFERENCE TO RELATED APPLICATIONS

This disclosure is a non-provisional patent application based upon provisional patent application 60/522,235, filed Sep. 3, 2004 by the same inventors and bearing the same title.

STATEMENT OF INTEREST

This work has been supported by Raytheon, Inc. grant CHARTFIELD STRING: USF01 TPA 22000 210600 000000 0000000 210610060.

BACKGROUND OF INVENTION

1. Field of the Invention

This invention relates, generally, to security measures for wireless transmissions. More particularly, it relates to methods for preventing synchronization to a transmitted signal by an unauthorized user.

2. Description of the Prior Art

Orthogonal frequency division multiplexing (OFDM) systems exhibit immunity to multipath distortion. In OFDM, the linear convolution of a transmitted signal with a channel impulse response (CIR) is converted to circular convolution by cyclically extending the transmitted OFDM symbols. The transmitted data symbols are recovered using a simple one-tap equalizer in the frequency domain. The redundancy introduced by cyclic prefix (CP) can be used for channel estimation and synchronization as well. However, CP may be undesirable for covert applications because unauthorized users may explore the periodicity introduced by the CP to synchronize to the transmitted signal.

Figure 1:
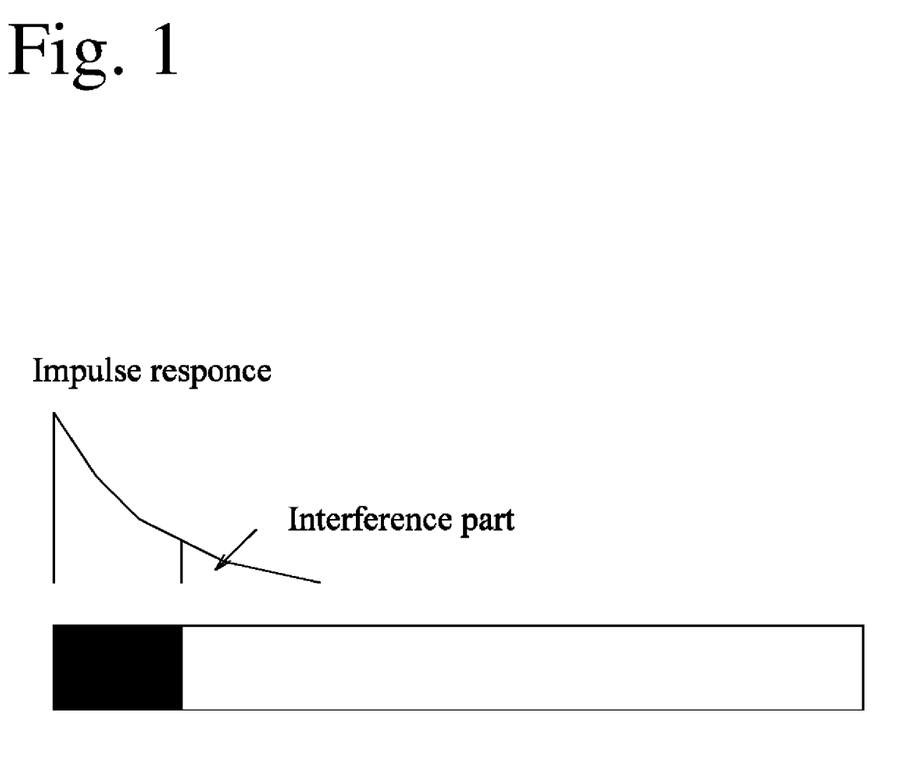
FIG. 1 is a diagrammatic view illustrating the bit error rate degradation due to short cyclic prefix as known in the prior art.

To remove the distortion due to multipath, the length of the CP should be larger than the maximum excess delay of the channel. When the length of the CP is smaller than the maximum excess delay, previously transmitted OFDM symbols interfere with a current OFDM symbol as indicated in FIG. 1 (prior art). This type of interference is known as inter-symbol interference (ISI) or interblock interference (IBI) and the performance degradation due to ISI is investigated in equations [1] and [2] below. The power spectral density of the interference is derived in terms of the CIR and the CP length in equation [1]. Assuming there are only post-cursors from the preceding symbol, the signal-to-noise ratio (SNR) of the received signal at each subcarrier position can be written as:

$$SNR(k) = \frac{1}{2} \frac{|H(k)|^2 N}{\sum_{n}^{L} N_{CP+1} |h_n|^2} \quad (1)$$

Where H(k) is the channel frequency response (CFR) at kth subcarrier, N is the fast Fourier transform (FFT) size, h is the nth tap of CIR, and L is the length of the CIR.

Figure 2:
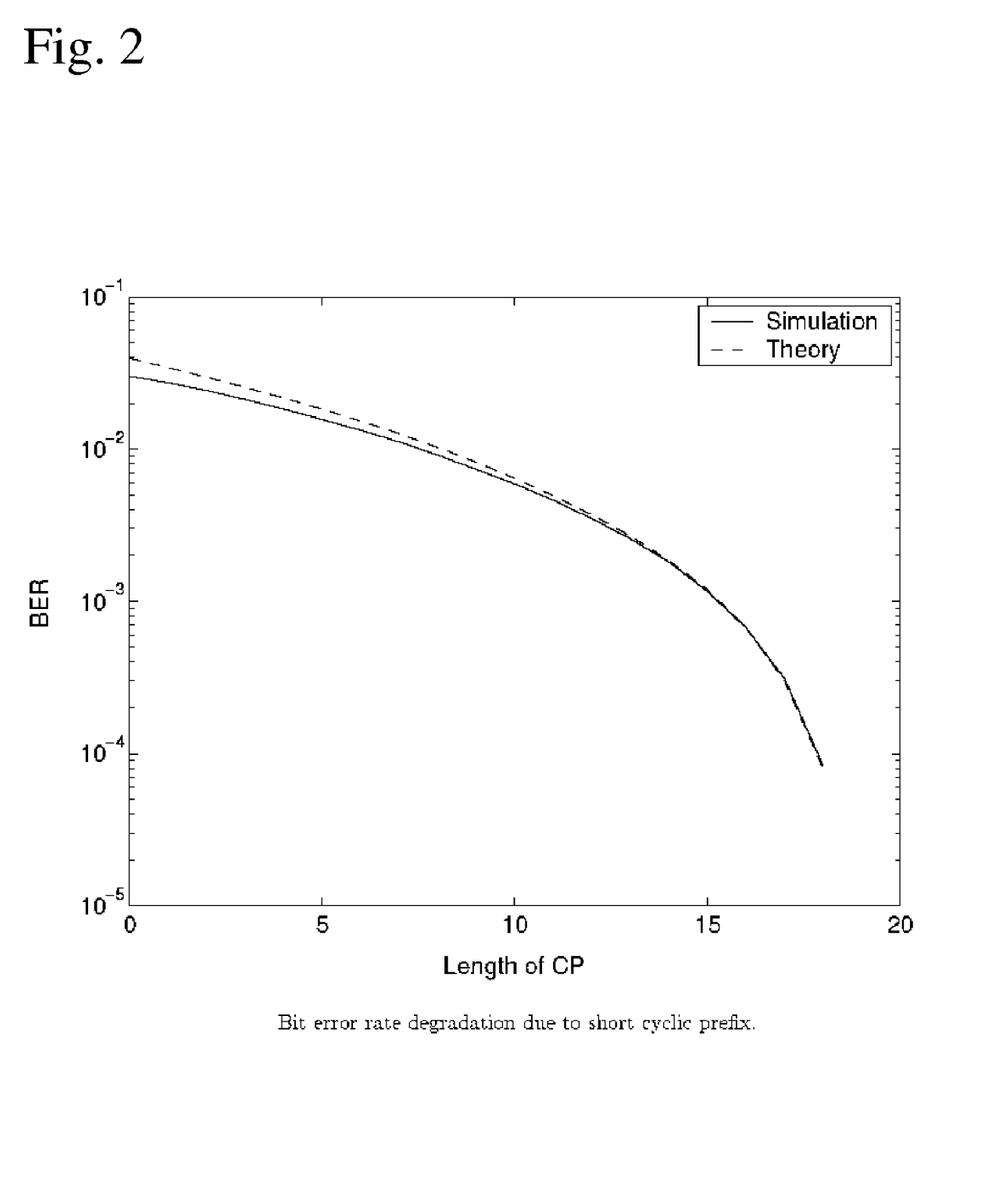
FIG. 2 is a graph representing the bit error rate (BER) degradation as a function of guard interval length in a noiseless environment as known in the prior art.

As indicated by equation (1), the degradation depends on the ratio between the tail power of the CIR and total power of CIR, as indicated in FIG. 2 (prior art), which shows BER degradation as a function of guard interval length in a noiseless environment. The length of the power delay profile (PDP) is denoted 20 and it is assumed to be exponentially decaying. Calculating the SNR in each sub-carrier and calculating the average BER provides theoretical results. As FIG. 2 shows, insufficient CP length causes irreducible error floor in OFDM.

The redundancy introduced by the CP can be used to estimate time and frequency offsets. Synchronization algorithms based on the maximum likelihood (ML), equation [3], minimum mean-square error (MMSE), equation [4], and the maximum correlation (MC), equation [5] criteria use the periodicity introduced by the cyclic prefix to estimate the timing and frequency offsets.

Figure 3:
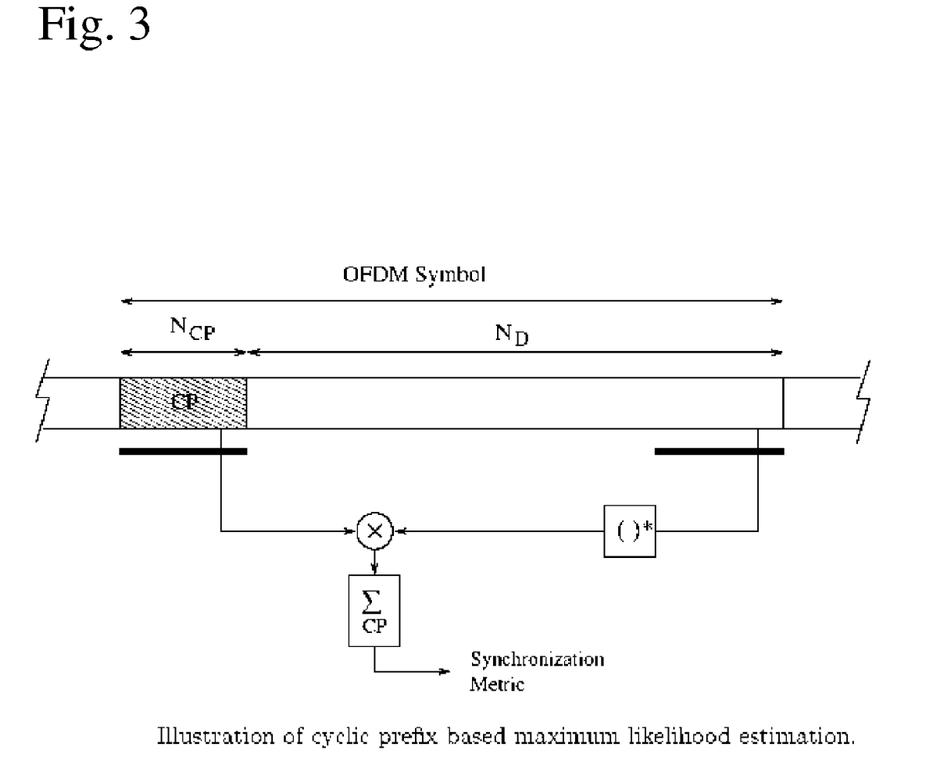
FIG. 3 is an illustration of the maximum likelihood method as known in the art, showing only one OFDM symbol.

The ML method is illustrated in FIG. 3 where only one OFDM symbol is shown. The synchronization metric obtained by one OFDM symbol can be written as $$M(m) = \sum_{n=0}^{N_{CP}-1} r(m-n)r*(m-n+N_D) \quad (2)$$

where r(n) is the received signal, $N_{CP}$ is the length of CP and $N_D$ is the length of the useful data part. Using (2), the timing position can be found as $$\hat{T}_n = \arg\max|M(m)| \quad (3)$$

and frequency offset estimation as $$\hat{\varepsilon} = \frac{1}{2\pi} \angle M(\hat{T}_n) \quad (4)$$

Figure 5:
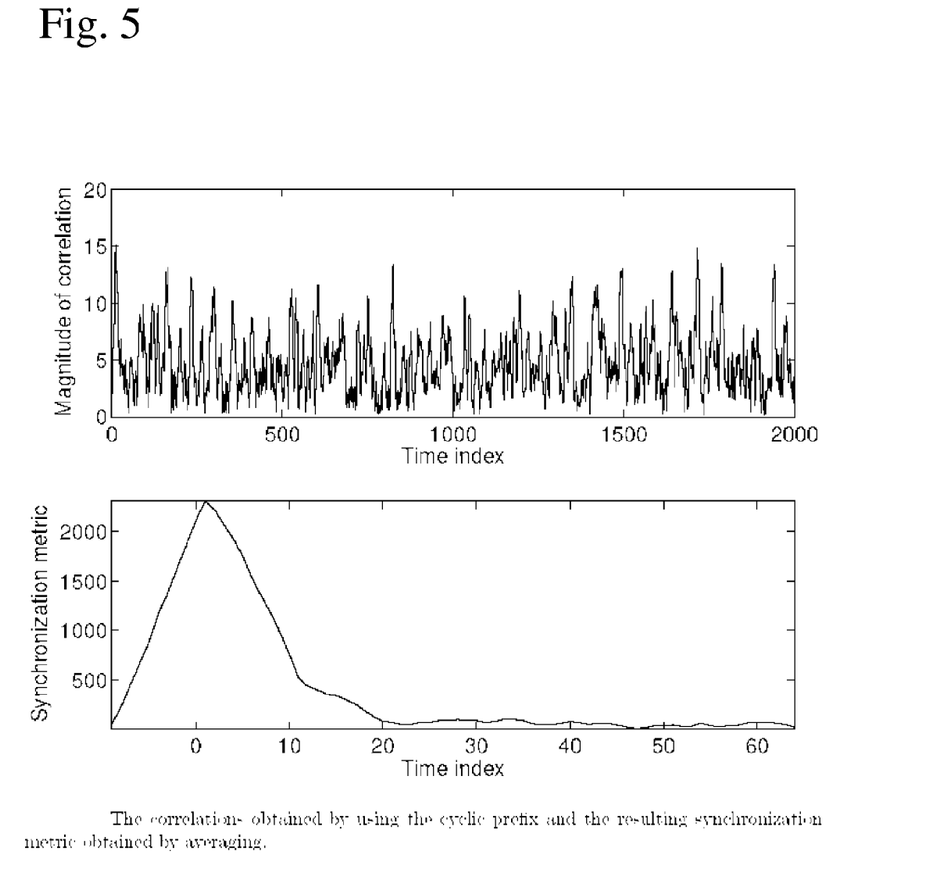
FIG. 5 is an illustration of the noisy correlation outputs from different OFDM symbols and the resulting synchronization metric which is obtained by averaging these correlations.

These estimates should be averaged over different OFDM symbols to obtain reliable estimates. Adding the correlation metrics from different symbols and dividing by the number of symbols provides the needed average. As the number of available OFDM symbols increase, the estimates become more accurate. The resulting synchronization metric and the final metric obtained by averaging are shown in FIG. 5 (prior art) where the effect of averaging is depicted.

Figure 4:
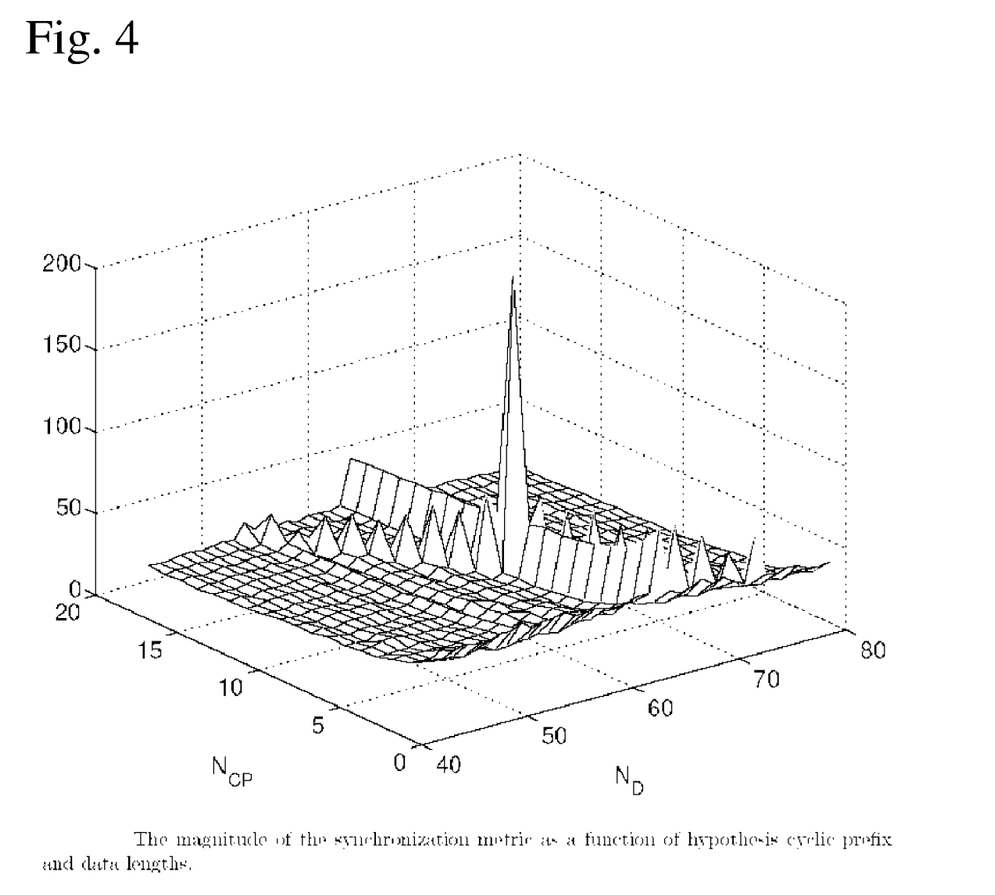
FIG. 4 is an illustration of the magnitude of the synchronization metric as a function of hypothesis cyclic prefix and data lengths.

The respective lengths of the OFDM symbol and CP can be estimated blindly by exhaustive searching. This knowledge gives undesired or unauthorized users the ability to synchronize to the transmitted signal. FIG. 4 (prior art) shows the magnitude of the synchronization metric as a function of different CP and OFDM symbol sizes. As indicated in FIG. 4, the peak occurs when the hypothesized lengths are equal to the correct lengths.

The periodicity inherently introduced by the usage of CP can be explored by undesired users to synchronize to the transmitted signal.

Accordingly, what is needed in the art is a technique that prevents unauthorized synchronization while maintaining the advantages of the CP.

However, in view of the prior art considered as a whole at the time the present invention was made, it was not obvious to those of ordinary skill in this art how the needed additional security could be provided.

SUMMARY OF THE INVENTION

The novel methods maintain the advantages of the cyclic prefix but prevent unauthorized exploitation of the cyclic prefix (CP) for synchronization. By allowing use of the CP, the novel methods provide secure data transmission by lowering coding requirements, thus providing high data transmission rates and decreased power consumption.

In a preferred embodiment, the size of the CP is changed, adaptively, depending upon channel conditions, and random signals are appended to some of the orthogonal frequency division multiplexing (OFDM) symbols in a pseudo-random manner to scramble the correlation peaks in the time domain.

When the correlation peaks are scrambled in time, unauthorized users who are not privy to the scrambling pattern cannot combine the synchronization information with the different symbols. The novel method therefore prevents unauthorized detection of the transmitted signal even if an unauthorized user achieves an initial synchronization.

The present invention makes wireless transmission more secure so that undesired users cannot probe transmitted information. This is especially important for military/defense applications. Moreover, commercial wireless system providers may incorporate this invention for the prevention of theft of service or for increasing user privacy.

More particularly, the novel method for preventing unauthorized exploitation of a cyclic prefix for synchronization, while maintaining the advantages of the cyclic prefix, includes the step of changing the length of OFDM symbols in a pseudo-random fashion by appending a random signal to at least one of the OFDM symbols. The invention further includes the steps of providing extra scrambling of the correlation peaks by changing the size of the random signal depending on a PN sequence, reducing bandwidth loss due to transmission of the random signal by using a known PN sequence, using the known PN sequence in an authorized receiver for synchronization, increasing the immunity to the multipath by changing the length of the CP in each OFDM symbol according to a PN sequence, thereby scrambling the correlation peaks, combining the adaptive cyclic prefix with channel coding, making the cyclic prefix smaller than a maximum excess delay of the channel, compensating for a performance loss by providing additional coding power, providing additional coding power by using very tight coding, and changing the FFT/IFFT sizes of each OFDM symbol based on a PN sequence, thereby providing two types of security by making synchronization and demodulation of a received signal difficult for unauthorized users.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Insufficient CP causes performance degradation and enables undesired users to synchronize to the transmitted signal as the length of the CP gets larger. Therefore, the present invention changes the length of the CP adaptively depending upon channel conditions. The length of the CP should be just enough to prevent ISI. By using a small CP, the present invention prevents synchronization of undesired users to the transmitted signal.

This adaptation requires knowledge of the maximum excess delay of the wireless channel that can be estimated using CFR [6] or channel frequency correlation (CFC) [7]. The length of the CP can be constant over a burst and the length information can be conveyed to the receiver by signaling. Changing the length of the CP adaptively also provides efficient channel utilization since the overall CP time is minimized.

In practical applications, extraction of the synchronization parameters by using the CP with only one OFDM symbol is difficult if not impossible, because the CP is perturbed by multipath components and additive noise. Moreover, the presence of frequency offset decreases the correlation between the repeated parts. To overcome this problem, averaging over a number of OFDM symbols is performed. FIG. 5 shows the noisy correlation outputs from different OFDM symbols and the resulting synchronization metric that is obtained by averaging said correlations. The instantaneous correlations are noisy and the resulting metric obtained by averaging has a peak around the correct timing point which is zero.

Averaging over different OFDM symbols can be done if the length of each OFDM symbol is precisely known.

Figure 6:
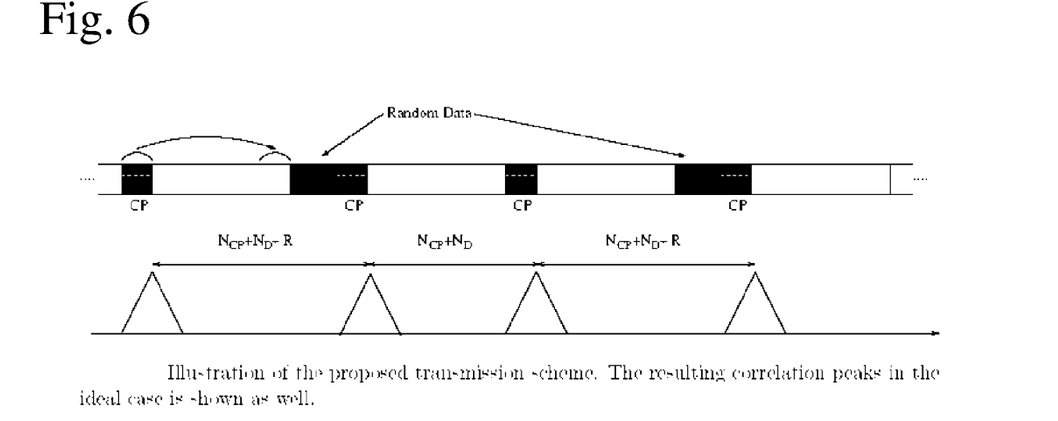
FIG. 6 is an illustration of the novel transmission method, including the resulting correlation peaks in the ideal case.

The present invention changes the length of OFDM symbols in a pseudo-random fashion by appending a totally random signal to some of the OFDM symbols. An integrated circuit having a processor generates the totally random signal and appends it to more than one OFDM symbol of a plurality of OFDM symbols in a frame so that the OFDM symbols in said plurality of OFDM symbols in said frame do not have a common length and so that correlation peaks are scrambled. The resulting frame structure and correlation peaks in a noiseless static channel is illustrated in FIG. 6 where the length of the CP is $N_{CP}$, the length of the data is $N_D$, and the length of the appended random signal is R. Using this method, the correlation peaks are scrambled in time. This prevents undesired users from using the CP for synchronization, since they cannot combine the information from different symbols as is possible with prior art systems. Even if an initial synchronization is obtained for the arriving frame, the receiver needs to know the exact start positions of the individual OFDM symbols. This is possible if the positions and lengths of the added random signals are known. An authorized user, on the other hand, can extract the transmitted information since the way the OFDM symbols are scrambled is known. The novel method prevents an unauthorized user from estimating the length of the CP and useful data by executive search method (see FIG. 4) as well.

A pseudo noise (PN)-based preamble is used for synchronization. Since only an authorized user knows the transmitted signal, unauthorized users cannot synchronize to the transmitted signal. Furthermore, the receiver can use the knowledge of scrambling pattern and the redundancy contained in the CP to obtain synchronization information by combining the correlation outputs from each OFDM symbol. Authorized users combine the synchronization information from the preamble and from the CP using an appropriate technique.

The decision on whether to append a random signal to a specific OFDM symbol or not can be made by using the transmitted preamble sequence, or by using the spreading and/or scrambling codes of users in MC-CDMA. If none of those are available, the transmitter must select some specific codes and convey the required information to the receiver.

The following novel method steps enhance the basic method:

1. Provide extra scrambling of the correlation peaks by changing the size of the random signal depending on a PN sequence.
2. Reduce the bandwidth loss due to the transmission of the random signal by using a known PN sequence Instead of a totally random signal. The known PN sequence is used in an authorized receiver for synchronization.
3. Increase the immunity to the multipath by changing the length of the CP in each OFDM symbol according to a PN sequence, thereby scrambling the correlation peaks.
4. Combine the adaptive cyclic prefix with channel coding. The cyclic prefix does not have to be the same as the maximum excess delay of the channel. It can be smaller but not larger (for security purposes). If it is smaller, the performance loss must be compensated for by additional coding power. In the limiting case, no CP is used and the 1 51 is compensated by using very tight coding.
5. Change the FFT/IFFT sizes of each OFDM symbol based on a PN sequence. This provides two types of security by making synchronization and demodulation of received signal difficult for unauthorized users.

It will thus be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween. Now that the invention has been described,

What is claimed is:

1. A method for preventing unauthorized exploitation of a cyclic prefix for synchronization in an OFDM system, the method comprising:
    employing an integrated circuit having a processor to generate at least one random signal having a selected length;
    pseudo-randomly identifying a portion of a plurality of OFDM symbols in an OFDM frame to which the at least one random signal will be added, wherein the portion of OFDM symbols pseudo-randomly identified is at least one, and is less than all, of the plurality of OFDM symbols in the OFDM frame; and
    appending the at least one random signal to the pseudo-randomly identified OFDM symbols.

2. The method of claim 1, wherein each OFDM symbol comprises a cyclic prefix (CP), the method further comprising:
    generating a pseudo-noise (PN) sequence; and
    adjusting the length of the cyclic prefix of each OFDM symbol in each frame according to the generated pseudo-noise (PN) sequence.

3. The method of claim 1, wherein each OFDM symbol comprises a cyclic prefix (CP), the method further comprising:
    determining at least one wireless channel condition of the OFDM system; and
    selecting the length of the cyclic prefix of each OFDM symbol based upon the at least one wireless channel condition.

4. The method of claim 3, wherein the at least one wireless channel condition of the OFDM system is the maximum excess delay of the wireless channel and wherein the length of the cyclic prefix is selected to be smaller than the maximum excess delay of the wireless channel.

5. The method of claim 1, further comprising:
    generating a pseudo-noise (PN) sequence; and
    changing the fast Fourier transform/inverse fast Fourier transform (FFT/IFFT) sizes of each OFDM symbol based on the pseudo-noise (PN) sequence.

6. The method of claim 1, wherein employing an integrated circuit having a processor to generate at least one random signal having a selected length further comprises:
    generating a pseudo-noise (PN) sequence; and
    generating a plurality of random signals, wherein the selected length of each of the plurality of random signals is determined by the pseudo-noise (PN) sequence.

7. The method of claim 6, wherein the PN sequence is a known PN sequence.

8. The method of claim 6, wherein appending the at least one random signal to the pseudo-randomly identified OFDM symbol, further comprises, appending at least one random signal of the plurality of random signals to each of the pseudo-randomly identified OFDM symbols.

9. The method of claim 1, wherein pseudo-randomly identifying the portion of the OFDM symbols further comprises:
    generating a pseudo-noise (PN) sequence; and
    pseudo-randomly identifying the portion of the OFDM symbols based upon the PN sequence.

10. A method for preventing unauthorized exploitation of a cyclic prefix for synchronization in an OFDM system, the method comprising:
    providing a frame comprising a plurality of OFDM symbols, each OFDM symbol having a cyclic prefix;
    generating a first random signal, the first random signal having a first length;
    generating a second random signal, the second random signal having a second length not equal to the first length;
    pseudo-randomly identifying a first OFDM symbol of the plurality of OFDM symbols;
    pseudo-randomly identifying a second OFDM symbol of the plurality of OFDM symbols;
    appending the first random signal to the first pseudo-randomly identified OFDM symbol in the frame; and
    appending the second random signal to the second pseudo-randomly identified OFDM symbol in the frame.

11. The method of claim 10, further comprising:
    pseudo-randomly identifying a third OFDM symbol of the plurality of OFDM symbols; and
    not appending the first random signal or the second random signal to the third pseudo-randomly identified OFDM symbol in the frame.

12. The method of claim 10, further comprising:
    generating a pseudo-noise (PN) sequence; and
    selecting the first length and the second length based on the PN sequence.

13. The method of claim 12, wherein the PN sequence is a known PN sequence.

14. The method of claim 10, further comprising:
    generating a third random signal, having a third length not equal to the first length or the second length;
    pseudo-randomly identifying a third OFDM symbol of the plurality of OFDM symbols; and
    appending the third random signal to the third OFDM symbol in the frame.

15. The method of claim 10, further comprising:
pseudo-randomly identifying a third OFDM symbol of the plurality of OFDM symbols; and
appending the first random signal to the third OFDM symbol in the frame.

16. A method for preventing unauthorized exploitation of a cyclic prefix for synchronization in an OFDM system, the method comprising:
providing a frame comprising a plurality of OFDM symbols, each OFDM symbol having a cyclic prefix;
generating a plurality of random signals, each of the plurality of random signals having a different length;
pseudo-randomly identifying a portion of the plurality of OFDM symbols to which one of the plurality of random signals will be added, wherein the portion of OFDM symbols pseudo-randomly identified is at least one, and is less than all, of the plurality of OFDM symbols in the OFDM frame; and
appending one random signal of the plurality of random signals to each of the pseudo-randomly identified OFDM symbols in the frame.

17. The method of claim 16, further comprising:
generating a pseudo-random (PN) sequence; and
selecting the length of each of the plurality of random signals is based on the PN sequence.

18. The method of claim 17, wherein the PN sequence is a known PN sequence.

19. The method of claim 16, further comprising:
generating a pseudo-random (PN) sequence; and
selecting the length of each of the plurality of random signals based upon the PN sequence.

20. An OFDM transmitter, comprising:
a processor; and
a tangible memory storage including instructions that cause the transmitter to:
generate a plurality of random signals, each of the plurality of random signals having a selected length,
pseudo-randomly identify a portion of a plurality of OFDM symbols in an OFDM frame to which one of the plurality of random signals will be added, wherein the portion of OFDM symbols pseudo-randomly identified is at least one, and is less than all, of the plurality of OFDM symbols in the OFDM frame,
append one random signal of the plurality of random signals to each pseudo-randomly identified OFDM symbol in the OFDM frame, and
transmit the frame.

21. The OFDM transmitter of claim 20, wherein each OFDM symbol comprises a cyclic prefix (CP) and wherein the instructions further cause the transmitter to:
generate a pseudo-noise (PN) sequence; and
select a length for the cyclic prefix (CP) for each of the plurality of OFDM symbols in the OFDM frame based on the pseudo-noise (PN) sequence.

22. The OFDM transmitter of claim 20, wherein each OFDM symbol comprises a cyclic prefix (CP) and wherein the instructions further cause the transmitter to:
determine at least one wireless channel condition of the OFDM transmitter; and
select the length of the cyclic prefix of each OFDM symbol based upon the at least one wireless channel condition.

23. The OFDM transmitter of claim 22, wherein the at least one wireless channel condition of the OFDM system is the maximum excess delay of the wireless channel and wherein the instructions further cause the transmitter to:
select the cyclic prefix to be smaller than the maximum excess delay of the wireless channel.

24. The OFDM transmitter of claim 20, wherein the instructions further cause the transmitter to:
generate a pseudo-noise (PN) sequence; and
change the fast Fourier transform/inverse fast Fourier transform (FFT/IFFT) sizes of each OFDM symbol based on the pseudo-noise (PN) sequence.

25. The OFDM transmitter of claim 20, wherein the instruction further cause the transmitter to:
generate a pseudo-noise (PN) sequence; and
select the length of each of the plurality of random signals based on the PN sequence.

26. The OFDM transmitter of claim 25, wherein the PN sequence is a known PN sequence.

27. The OFDM transmitter of claim 20, wherein the instructions cause the transmitter to:
generate a pseudo-noise (PN) sequence; and
pseudo-randomly identify the portion of OFDM symbols based upon the PN sequence.

28. The OFDM transmitter of claim 20, wherein the instructions further cause the transmitter to:
generate a pseudo-noise (PN) sequence, and
pseudo-randomly identify the portion of the OFDM symbols based upon the PN sequence.

29. An OFDM transmitter, comprising:
a processor; and
a tangible memory storage including instructions that cause the transmitter to:
provide a frame comprising a plurality of OFDM symbols, each symbol having a cyclic prefix,
generate a first random signal, the first random signal having a first length,
generate a second random signal, the second random signal having a second length not equal to the first length,
pseudo-randomly identify a first OFDM symbol of the plurality of OFDM symbols,
pseudo-randomly identify a second OFDM symbol of the plurality of OFDM symbols,
append the first random signal to the first pseudo-randomly identified OFDM symbol in the frame, and
append the second random signal to the second pseudo-randomly identified OFDM symbol in the frame.

30. The OFDM transmitter of claim 29, wherein the instructions further cause the transmitter to:
pseudo-randomly identify a third OFDM symbol of the plurality of OFDM symbols; and
not append the first random signal or the second random signal to the third pseudo-randomly identified OFDM symbol in the frame.

31. The OFDM transmitter of claim 29, wherein the instructions cause the transmitter to:
generate a pseudo-noise (PN) sequence; and
select the first length and the second length based on the PN sequence.

32. The OFDM transmitter of claim 31, wherein the PN sequence is a known PN sequence.

33. The OFDM transmitter of claim 29, wherein the instructions further cause the transmitter to:
generate a third random signal, having a third length not equal to the first length or the second length;
pseudo-randomly identify a third OFDM symbol of the plurality of OFDM symbols; and
append the third random signal to the third pseudo-randomly identified OFDM symbol in the frame.

34. The OFDM transmitter of claim 29, wherein the instructions further cause the transmitter to:
pseudo-randomly identify a third OFDM symbol of the plurality of OFDM symbols; and
append the first random signal to the third pseudo-randomly identified OFDM symbol in the frame.

35. An OFDM transmitter, comprising:
a processor; and
a tangible memory storage including instructions that cause the transmitter to:
provide a frame comprising a plurality of OFDM symbols, each OFDM symbol having a cyclic prefix,
generate a plurality of random signals, each of the plurality of random signals having a selected length, and
pseudo-randomly identify a portion of the plurality of OFDM symbols in the OFDM frame to which one of the plurality of random signals will be added,
wherein the portion of OFDM symbols pseudo-randomly identified is at least one, and is less than all, of the plurality of OFDM symbols in the OFDM frame,
append one random signal of the plurality of random signals to each pseudo-randomly identified OFDM symbol in the OFDM frame.

36. The OFDM transmitter of claim 35, wherein the instructions further cause the transmitter to:
generate a pseudo-noise (PN) signal,
select the length of each of the plurality of random signals based on the PN sequence.

37. The OFDM transmitter of claim 35, wherein the PN sequence is a known PN sequence.

38. The OFDM transmitter of claim 35, wherein the instructions cause the transmitter to:
generate a pseudo-noise (PN) sequence; and
pseudo-randomly identify the portion of OFDM symbols based upon the PN sequence.

* * * * *